(No Model.)

J. B. HINTON.
BRAKE FOR VEHICLES.

No. 329,312. Patented Oct. 27, 1885.

(No Model.)  2 Sheets—Sheet 2.

J. B. HINTON.
BRAKE FOR VEHICLES.

No. 329,312.　　　　Patented Oct. 27, 1885.

Witnesses:

Inventor:
John Brundage Hinton

UNITED STATES PATENT OFFICE.

JOHN BRUNDRAGE HINTON, OF SAN DIEGO, CALIFORNIA.

BRAKE FOR VEHICLES.

SPECIFICATION forming part of Letters Patent No. 329,312, dated October 27, 1885.

Application filed April 15, 1885. Serial No. 162,379. (No model.)

*To all whom it may concern:*

Be it known that I, JOHN BRUNDRAGE HINTON, a citizen of the United States, residing at the city of San Diego, county of San Diego, and State of California, have invented a new and useful Brake for Vehicles, of which the following is a specification.

My invention relates to the application of a brake to a vehicle by the use of any kind of a flexible cable in such a manner that while it can be applied to any vehicle it is especially applicable to what is known as "cut-under vehicles"—that is, such vehicles whose fore wheels turn under the box or bed in a place cut or made for that purpose in the bed. I attain this object by the mechanism illustrated in the accompanying drawings.

Figure 1:
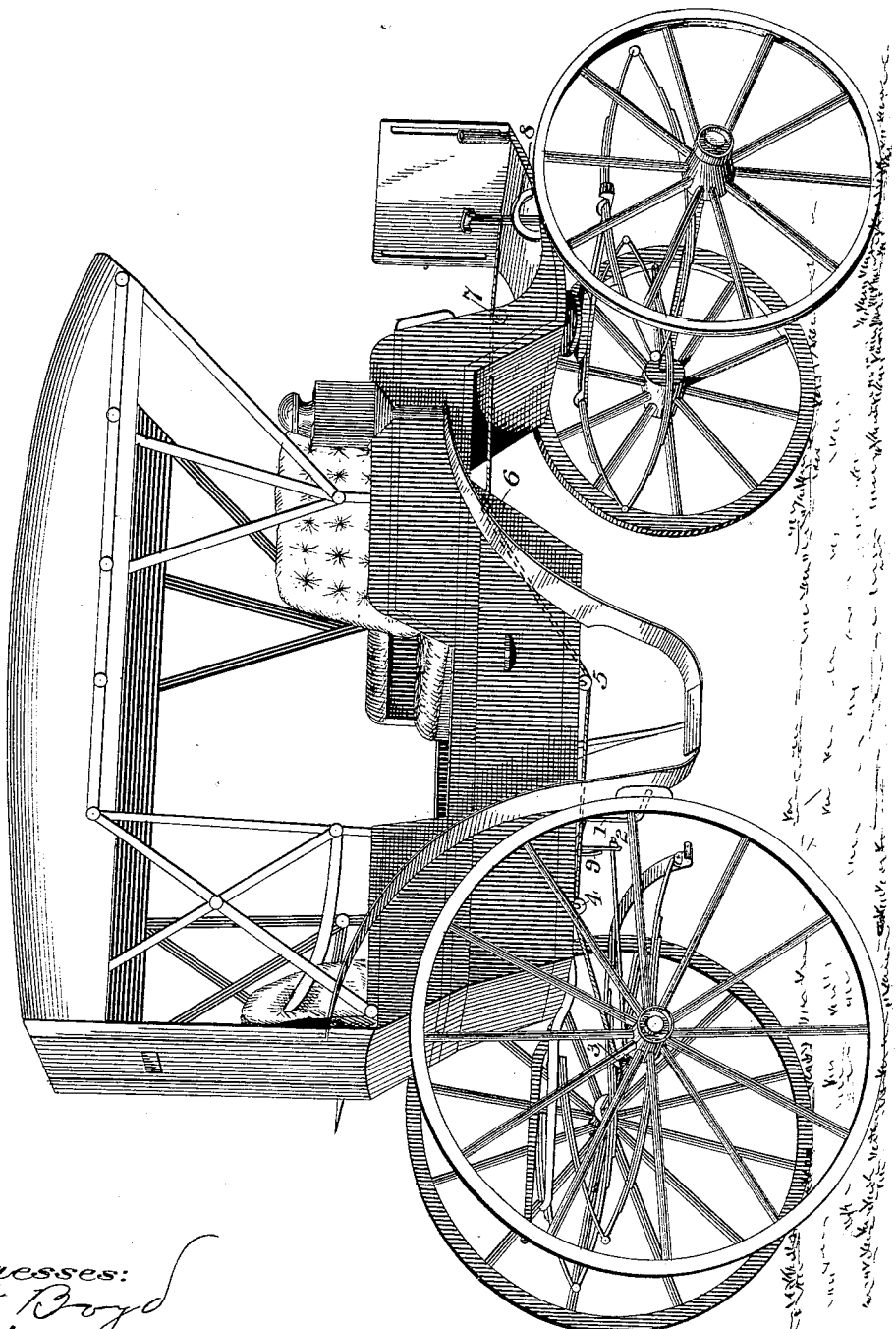
Figure 2:
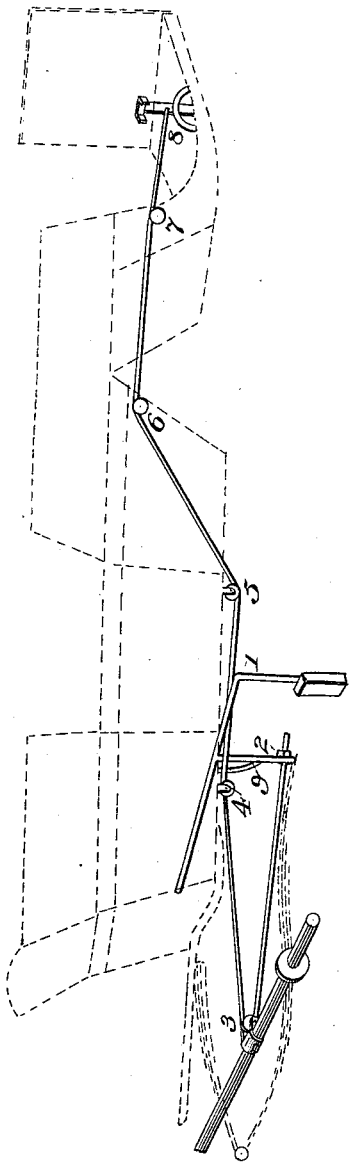

Drawing No. 1 is a complete view of the "Hinton noiseless cable brake" applied to a vehicle in practical use. The ordinary brake-bar is used, extending from one side of the vehicle to the other, with a shoe neatly fitting onto each hind wheel, Figure 1 in Drawing No. 2. To this cross-bar is attached a lever, Fig. 2, running down, with a hole in the lower end to receive the cable. Through this hole is passed the end of a flexible cable made of wire rope, chain, or anything possessing the necessary flexibility and strength. This end is fitted to a screw-coupling and fastened with a nut, so that at any time the slack of the cable may be taken up. The cable then passes back and around a pulley, Fig. 3, firmly attached to the rear axle of the vehicle; thence forward and over pulley at Fig. 4; thence along the bed to a pulley at Fig. 5, near the rear of the "cut-under;" thence to the pulley at Fig. 6, above the cut-under; thence forward, running over pulley at Fig. 7 to the foot-lever, resting in a slotted iron guide. At Fig. 9 a spring is attached, which operates to throw off the brake when the force is removed from the foot-lever.

Heretofore there has never, to my knowledge, been a brake successfully applied to a cut-under vehicle with side doors.

The whole apparatus is noiseless, light, and powerful, and I claim the same as my invention, and desire to secure by Letters Patent—

The combination of the axle, the wheels journaled to, and a pulley, 3, supported on, said axle, the body, the guide-pulleys and brake-lever supported on said body, the brake-shaft, a crank-arm, 2, projecting from such shaft, and the brake-cord secured at one end to said arm and extended thence around the pulley 3, thence forward around the guide-pulleys on the body and connected with the lever, substantially as set forth.

JOHN BRUNDRAGE HINTON.

Witnesses:
D. C. REED,
J. B. BOYD.